United States Patent
Charbonnier

(10) Patent No.: US 6,567,673 B1
(45) Date of Patent: May 20, 2003

(54) METHOD FOR COMMUNICATING A CELLULAR RADIO AND SATELLITE COMMUNICATION TERMINAL, AND TERMINAL FOR IMPLEMENTING SAID METHOD

(75) Inventor: Philippe Charbonnier, Le Mesnil Le Roi (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/485,555
(22) PCT Filed: Jun. 15, 1999
(86) PCT No.: PCT/FR99/01415
§ 371 (c)(1),
(2), (4) Date: Apr. 24, 2000
(87) PCT Pub. No.: WO99/66659
PCT Pub. Date: Dec. 23, 1999

(30) Foreign Application Priority Data

Jun. 16, 1998 (FR) .............................................. 98 07566

(51) Int. Cl.[7] .............................................. H04M 1/100
(52) U.S. Cl. ........................ 455/552; 455/553; 455/427
(58) Field of Search ................................ 455/427, 433, 455/414, 445, 552, 553, 550, 422, 3.02, 13.2, 12.1, 98

(56) References Cited

U.S. PATENT DOCUMENTS

| | | | | |
|---|---|---|---|---|
| 5,956,646 A | * | 9/1999 | Kolev et al. ................ | 455/12.1 |
| 6,256,497 B1 | * | 7/2001 | Chambers .................... | 455/432 |
| 6,272,315 B1 | * | 8/2001 | Chang et al. ............. | 342/357.1 |
| 6,317,412 B1 | * | 11/2001 | Natali et al. ................ | 370/208 |
| 6,400,946 B1 | * | 6/2002 | Vazvan et al. .............. | 455/432 |

FOREIGN PATENT DOCUMENTS

| EP | WO 96/34503 | 10/1996 |
|---|---|---|
| EP | 0 831 599 | 3/1998 |
| EP | WO 98/20629 | 5/1998 |

* cited by examiner

Primary Examiner—William Trost
Assistant Examiner—Congvan Tran
(74) Attorney, Agent, or Firm—Greenberg Traurig; Eugene C. Rzucidlo; Richard E. Kurtz, II

(57) ABSTRACT

This invention relates to a radio communication terminal, such as for example, a mobile telephone, which has access to a satellite-based communication network. In the course of one and the same communication, the terminal transmits information via an up pathway and receives information via a down pathway. One of the two pathways, up or down, is cellular and the other pathway is satellite-based.

10 Claims, 2 Drawing Sheets

Figure 1:
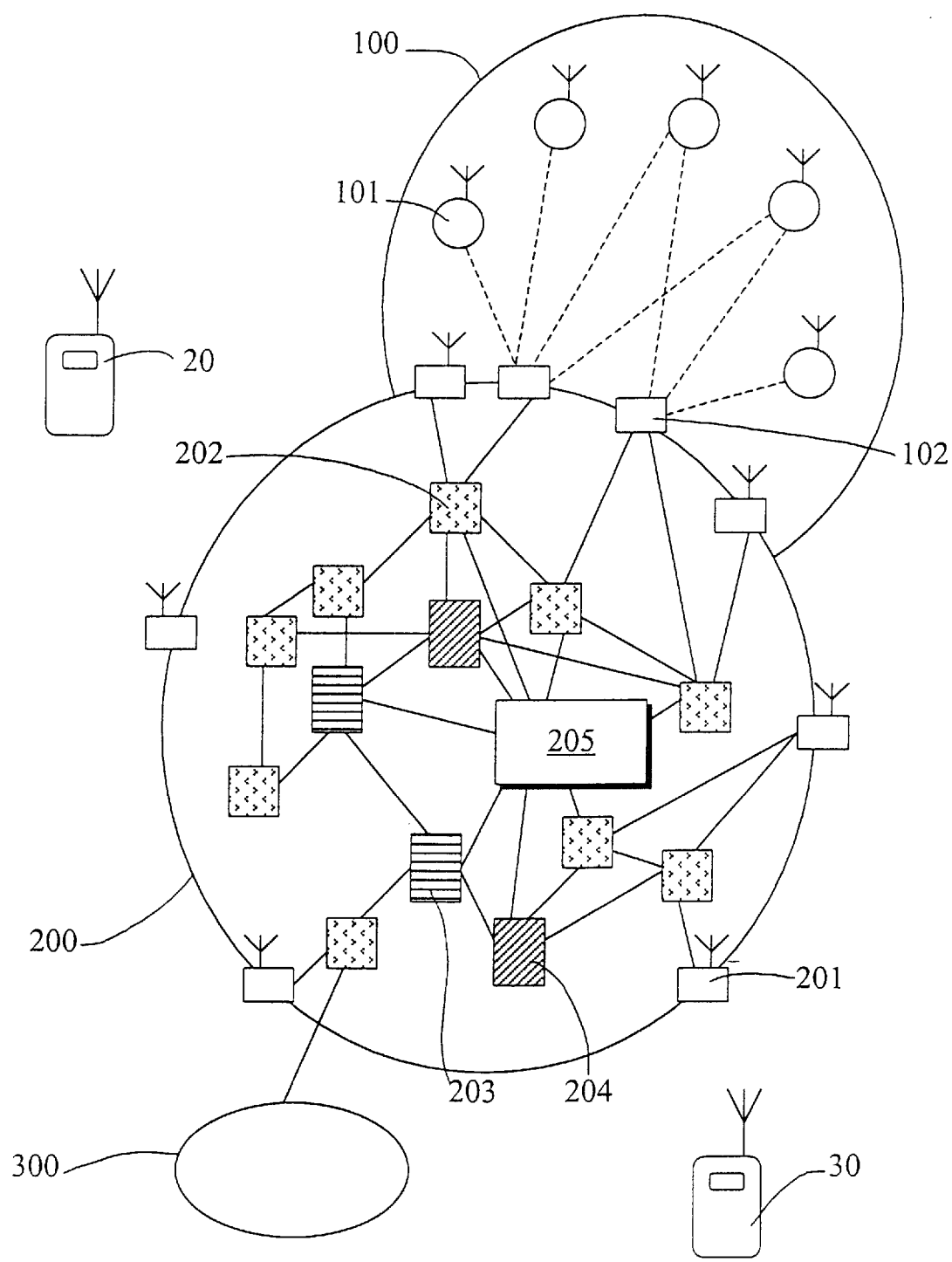

METHOD FOR COMMUNICATING A CELLULAR RADIO AND SATELLITE COMMUNICATION TERMINAL, AND TERMINAL FOR IMPLEMENTING SAID METHOD

In mobile telephony, a new generation of mobile telephones, the "third generation" using new technologies (relating to standards such as for example the UMTS standard—Universal Mobile Telephone System), is currently being developed. It involves telephones having access to a terrestrial cellular network and access to a satellite-based telephone network comprising a plurality of terrestrial satellites. It will be noted at the outset that the term "satellite-based" will be used to refer to that which is satellite related, by analogy with the term "cellular" which t refers, in mobile telephony, to the topographical cell centered on a terrestrial base station.

By virtue of the interconnections between networks, a mobile telephone of a satellite-based network can communicate with a mobile telephone of a cellular network. During the communication, the satellite-based telephone transmits a stream of information, to an accessible satellite of its satellite-based network, via a satellite-based up pathway, for the satellite-based telephone. The information is thereafter conveyed by the satellite-based network and then by the cellular network to a base station of the cellular network, covering the area in which the cellular telephone is located. The base station forwards the information to the cellular telephone, via a cellular down pathway, for the cellular telephone. In symmetrical fashion, the cellular telephone transmits a stream of information to the base station, via a cellular up pathway. This stream of information is conveyed by the cellular network and then by the satellite-based network to the satellite which forwards the information to the satellite-based telephone, via a satellite-based down pathway.

According to the terminology used by the person skilled in the art, a pathway designates the channel for transporting the information transmitted, the route taken by this information. This pathway can be satellite-based, in the case where the information travels via a satellite-based network, or cellular, in the case where the information travels via a cellular network. The pathway is up when it transports an up stream of information, starting from the telephone, and down when it transports a down stream of information, arriving at the telephone.

A satellite-based network has the advantage of covering, with a reduced number of satellites, geographical areas which are very extensive and/or difficult to cover with a cellular network, such as for example oceans, deserts or mountainous regions. Furthermore, a satellite-based network can support much larger data bit rates than a cellular network. On the other hand, the cost of communications through a cellular network is generally more advantageous than that of communications through a satellite-based network.

The invention proposes to benefit still further from combined exploitation of terrestrial cellular communication networks and satellite-based communication networks for mobile telephones, or even, more generally, for any radio communication terminals.

For this purpose, the invention relates to a communication process for a radio communication terminal having access to a cellular communication network and access to a satellite-based communication network, in which, in the course of one and the same communication, the terminal transmits information via an up pathway and receives information via a down pathway, one of the two pathways, up and down, being cellular and the other pathway being satellite-based.

In the invention, it is noteworthy that the two pathways, up and down, are asymmetrical. One is satellite-based and the other cellular.

Such asymmetry is very beneficial, in particular when the up and down information streams are themselves asymmetrical. Such is the case for example when a mobile telephone is communicating with an information server, to which it dispatches requests only, but receives in response a very large stream of information.

It is also possible to benefit from the asymmetry of the up and down pathways when communicating from one point to multiple points, for example during a telephone conference. For speed reasons, it is then preferable for the multiple points to receive the information via a satellite-based pathway, one and the same satellite being able to cover a very wide extent.

It is also possible, simply for cost reasons or so as to optimize the cost/quality ratio of the communication, to chose to route the up pathway onto one of the networks and the other pathway onto the other network, according to circumstances.

Advantageously, a system for managing traffic being provided so as to manage the traffic of the information through the satellite-based and cellular networks, the system for managing traffic searches for the most suitable networks for the up pathway and for the down pathway, respectively.

Again advantageously, the search for networks takes account of the respective locations of the terminal and of its opposite party and of the loading of the networks.

Preferably, the terminal searches for the most suitable networks for the up pathway and for the down pathway.

In this case, and again advantageously, the search of the terminal takes account of the requirements of the terminal.

Lastly, the system for managing traffic and the terminal can negotiate the choice of networks for the up pathway and for the down pathway.

The invention also relates to a radio communication terminal for implementing the above process, devised so as to communicate through a cellular network and through a satellite-based network, comprising transmission means intended to transmit a stream of information via an up pathway and reception means intended to receive a stream of information via a down pathway, wherein the up pathway can be routed onto one of the two networks, satellite-based and cellular, and the down pathway can be routed onto the other network, in the course of one and the same communication.

Figure 2:
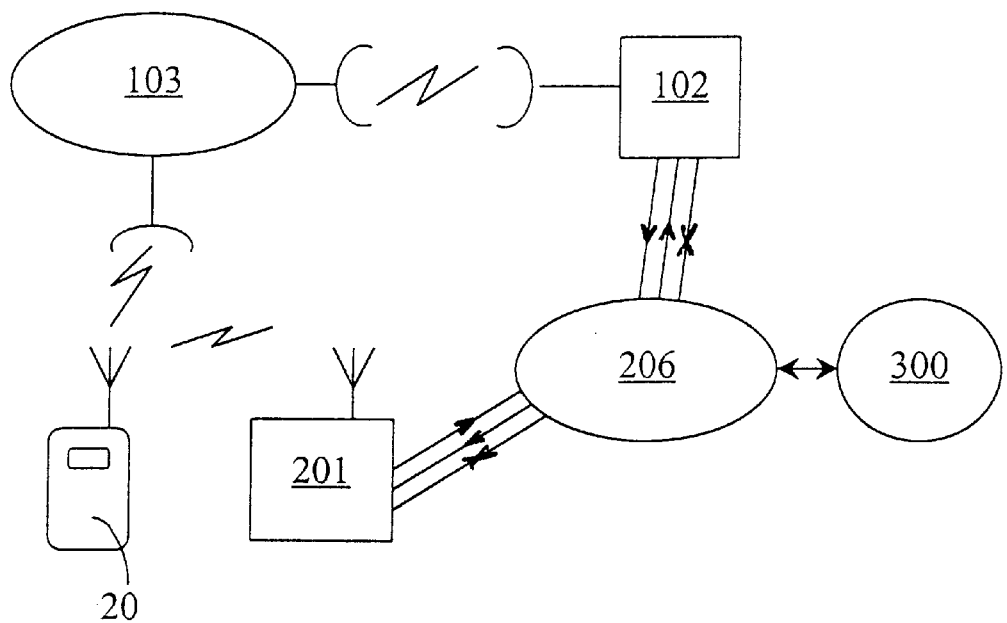
Figure 3:
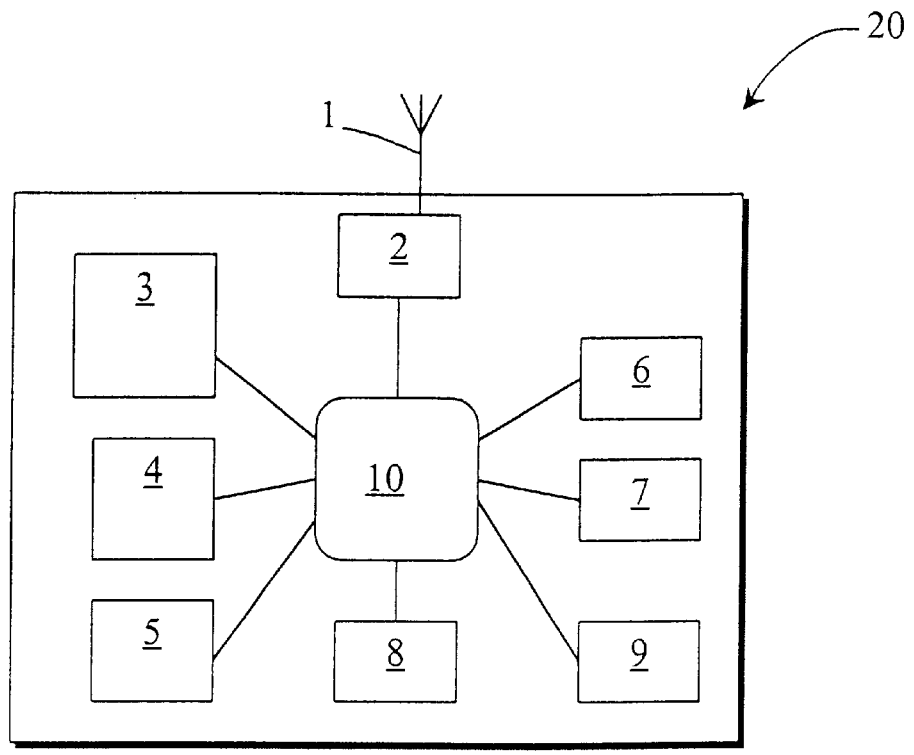

The invention will be better understood with the aid of the following description of a particular mode of realization of the communication process of the invention and of a particular embodiment of the radio communication terminal of the invention with reference to the appended drawing in which:

FIG. 1 represents a schematic diagram of a cellular network and of a satellite-based network, FIG. 2 represents a simplified diagram of the diagram of FIG. 1 and FIG. 3 represents a functional block diagram of the radio communication terminal, according to the particular embodiment.

In the particular example of the description, the radio communication terminal is a mobile telephone 20 having access to a cellular communication network 200 and access to a satellite-based communication network 100.

The cellular network 200 comprises:

- base stations 201, to which mobile telephones "hook up", connect up by radio link so as to communicate through the cellular network 200, each covering a topographical cell, in other words a determined terrestrial geographical area around the base station,
- MSC centers 202 (Mobile Switching Centers), intended to transmit and to route the data of a communication to another MSC center which is closer to the destination of the data, or to the destination base station to which the destination telephone is connected,
- VLR registers 203 (Visited Location Registers) and HLR registers 204 (Home Location Registers) containing subscription parameters and the locations of the mobile telephones pinpointed by an MSC center 202 and
- a traffic management center 205 intended for managing the data traffic through the cellular 200 and satellite-based 100 networks.

The management center, or system, 205 is intended to search, in cooperation with the MSC centers 202 and with the VLR 203 and HLR 204 registers, for the most effective route, or path, for conveying data from a departure point to at least one destination point, given in particular the loading of the networks 200 and 100, and the most suitable networks for the up pathway and for the down pathway respectively of a mobile telephone, during one and the same communication of the latter, as will be explained in the description of the communication process.

The satellite-based network 100 comprises a plurality of radio communication terrestrial satellites 101 orbiting the Earth, each covering a determined, here fixed, terrestrial geographical area.

The cellular network 200 and the satellite-based network 100 are interconnected, by way of a plurality of satellite stations 102 based on Earth, each linked up with at least one satellite 101 and with at least one MSC center 202.

Each MSC center 202 is connected to at least one other MSC center 202. The base stations 201 and the satellite stations 102 are each connected to at least one MSC center 202. Likewise, each MSC center 202 is connected to a location register (VLR 203 or HLR 204). Lastly, the traffic management center 205 is connected to a plurality of MSC centers 202 as well as to the registers HLR 204 and VLR 203. In short, the elements (MSC centers 202, HLR registers 204 and VLR registers 203, management center 205) of the cellular 100 and satellite-based 200 networks are all connected together, directly or with interposition of other elements.

Furthermore, the cellular 200 and satellite-based 100 networks are interconnected with other telephone networks 300 (switched telephone network STN and integrated services digital network ISDN) by way of MSC centers 202.

It will be noted that, in FIG. 2, the block 103 represents the constellation of satellites 101 of the satellite-based network 100 and the block 206 represents a subsystem of the networks comprising the management center 205, the MSC centers 202, and the VLR 203 and HLR 204 registers.

The infrastructure of the cellular network 200 and satellite-based network 100 is devised so as to manage, separately, independently of one another, the up pathway and the down pathway of a mobile telephone, during one and the same communication. It is furthermore devised so as to be able to switch from one network to another network not only bidirectional links, but also unidirectional links.

It is recalled here that the term "pathway" is understood to designate the transport channel for information, data, of a mobile telephone. A pathway is said to be "satellite-based" when the data taking this pathway start from the mobile telephone and head toward the satellite-based network 100 in the case of an up pathway, or arrive at the mobile telephone having departed from the satellite-based network 100, in the case of a down pathway. Likewise, a pathway is said to be "cellular" when the data taking this pathway start from the mobile telephone and head toward the cellular network 200, in the case of an up pathway, or arrive at the mobile telephone having departed from the cellular network 200, in the case of a down pathway.

The mobile telephone 20 represented in FIG. 3, is devised so as to communicate through the cellular network 200, in cellular mode, and through the satellite-based network 100, in satellite-based mode, and comprises a radio antenna 1, a radio transmission and reception block 2, connected to the antenna 1, a man/machine interface 3, a supply battery 4 and, in memory 5, various voice communication applications (bidirectional voice communication with an opposite party, dispatching of a voice message to an opposite party) and non-voice communication applications (dispatching of a written message to an opposite party, consulting of information on a server, etc.).

The radio antenna 1 and the transmission and reception block 2 are capable of transmitting and receiving data via the satellite-based network 100 and via the cellular network 200. The block 2 comprises a radio transmission chain and a radio reception chain which are devised to operate simultaneously, in the course of one and the same communication, either both in the same mode, (cellular or satellite-based), or one in one of the modes (satellite-based and cellular) and the other in the other mode. During a communication, an up stream of information, data, is transmitted by the radio transmission chain, via an up pathway, satellite-based or cellular, and a down stream of data is received by the radio reception chain, via a down pathway, satellite-based or cellular.

The telephone 20 furthermore comprises, in memory 6, a protocol for communication through the cellular network 200 and, in memory 7, a protocol for communication through the satellite-based network 100.

Lastly, the telephone 20 comprises a coordination module 8, a module 9 for searching for networks and a control block 10, in this instance a microcontroller, to which all the elements of the telephone 20 are connected and which is intended to control the operation of the telephone 20.

The coordination module 8 is intended to route each of the up and down pathways of the telephone 20 onto one of the networks, satellite-based 100 and cellular 200, as will be explained in the description of the communication process. During one and the same communication, the up pathway and the down pathway can either both be satellite-based, or cellular, or one be satellite-based and the other cellular.

The module 9 for searching for networks is intended to search for the most suitable networks for the up pathway and for the down pathway of the mobile telephone 20, as will be seen hereinafter.

Each communication of the telephone 20 exhibits particular characteristics, depending on the application used. It may be a voice or non-voice communication, a bidirectional or unidirectional communication, a communication with one or more opposite parties, consultation of an information server, or again by way of example, the dispatching of a voice or written message. Furthermore, depending on its location, the mobile telephone 20 can be positioned outside or on the boundary of an area of coverage of the cellular network, and/or of the satellite-based network, or inside a base station cell 201 and/or an area of coverage of a satellite 101 of the satellite-based network 100. As a function of all these characteristics relating to the communication of the telephone 20 and to its location, the energy consumption of the battery 4 of the telephone 20, the quality of the communication, the bit rate of the data in each of the up and down pathways of the telephone 20 and the cost of the communication can vary.

Furthermore, the satellite-based network 100 and the cellular network 200 each exhibit specific characteristics. The satellite-based network offers better geographical coverage and supports much larger data bit rates than the cellular network 200. Furthermore, in the case of a communication from one point to multiple points, a telephone conference for example, for speed reasons, it is preferable for the down pathways of the multiple points to be satellite-based. On the other hand, the cost of communications through the cellular network 200 is more advantageous than through the satellite-based network 100 and a cellular up pathway expends less of the energy of the battery 4 of the telephone 20 than a cellular up pathway. In short, each of the networks, cellular 200 and satellite-based 100, has different advantages and drawbacks.

As a function of the requirements, or constraints, of the telephone 20 (in terms of energy consumption, cost and bit rate in each of the up and down pathways) and of its location, the search module 9 is intended to search for the most suitable networks for the up pathway and for the down pathway of the telephone 20.

After the structural description of the mobile telephone 20, its manner of operation, corresponding to the communication process of the invention, will now be described.

The case of an incoming call to the telephone 20 and of an outgoing call from the telephone 20 will be explained.

1) Incoming Call

In the particular example of the description, a mobile telephone 30, having access to the cellular network 200 and access to the satellite-based network 100, calls the telephone 20 so as to establish a bidirectional voice communication therewith, in duplex.

The mobile telephones 20 and 30 have a location $P_1$ and a location $P_2$ respectively, each of which is indexed in a location register (VLR 203 or HLR 204).

The telephone 20 is situated inside the cell of a base station 201 but at the boundary of the area of coverage of the cellular network 200, and inside the area of coverage of a satellite 101 of the satellite-based network 100. When quiescent, the telephone 20 is in radio contact, here by periodic sounding, with the satellite 101 of the satellite-based network 100 and the base station 201 of the cellular network 200, listening out for any incoming calls on these networks 100 and 200, and pinpointed by the two networks, cellular 200 and satellite-based 100.

When establishing the communication, the traffic management center 205 is informed of the characteristics of the communication requested by the telephone 30 and ascertains the respective locations $P_1$ and $P_2$ of the calling telephone 30 and of the called telephone 20, by consulting the VLR 203 and HLR 204 location registers. Depending on the locations $P_1$ and $P_2$, the management center 205 searches for the possible routes, in both directions, through the cellular network 200 and satellite-based network 100, for conveying the data between the two telephones 20 and 30. It will be stressed here that, for one and the same communication, the data path from the telephone 30 to the telephone 20 and the data path from the telephone 20 to the telephone 30 may be different.

Additionally, the traffic management center 205 regularly interrogates the MSC centers 202 so as to discover the loading of the network, stated otherwise the traffic congestion, through these various routes.

From among the possible routes previously determined, the management center 205 selects the most effective routes, in each of the directions (from the telephone 20 to the telephone 30 and vice versa), as a function of the loading of the networks on these routes and of the characteristics of the communication, and hierarchizes the selected routes according to their effectiveness. The management center 205 thus searches for the most suitable networks, respectively, for the up pathway and for the down pathway of the telephone 20, given the respective locations of the mobile telephone 20 and of its opposite party 30 and the loading of the networks. In fact, for each of the up and down pathways of the telephone 20, the management center 205 determines which network is the most suitable, the most effective, and whether the other network is nevertheless appropriate, but with lesser effectiveness. In the particular example of the description, the management center 205 determines that the satellite-based network 100 is the most suitable for the up pathway, owing to the location $P_1$ of the mobile telephone, but that the cellular network 200 would nevertheless be acceptable, and that only the satellite-based network 100 is appropriate for the down pathway for reasons of the loading of the cellular network 200.

The management center 205 then presents the incoming call from the telephone 30 onto the most effective determined satellite-based down pathway of the telephone 20.

On receipt of the call, the telephone 20, with the aid of the network search block 9, searches for the most suitable networks for the up pathway and for the down pathway respectively, taking account of its requirements (in terms of energy of the battery 4, cost, application, etc.), and of its location relative to the respective areas of coverage of the cellular network 200 and of the satellite-based network 100. The telephone 20 thus determines, for each of the up and down pathways, which network is the most appropriate and whether the other network might nevertheless be appropriate with lesser effectiveness. In the particular example of the description, the battery of the telephone 20 is in large part discharged and the telephone 20 is positioned at the boundary of the area of coverage of the cellular network 200. The telephone 20 therefore determines that, for the down pathway, the satellite-based network is the most suitable, by reason of quality of the communication, but that the cellular network may nevertheless be appropriate, and that the up pathway absolutely must be cellular, by reason of saving of the energy of the battery 4.

The telephone 20 and the traffic management center 205 then negotiate with one another over the choice of the network for the up pathway and of the network for the down pathway.

During the negotiation, the traffic management center 205 informs the telephone 20 of the most suitable network (satellite-based or cellular), depending on its search, for each of the up and down pathways, and, as the case may be, of the possibility of routing one of the pathways, or both, onto the other network.

Depending on this information and on the result of its own network search, the telephone 20 chooses the cellular network 200 for the up pathway and the satellite-based network 100 for the down pathway and initiates the communication with the telephone 30.

During the communication between the two telephones 20 and 30, the telephone 20 transmits a stream of data via the cellular up pathway and receives a stream of data via the satellite-based down pathway. In the telephone 20, the coordination module 8 is responsible for routing the up pathway and the down pathway onto the cellular network 200 and onto the satellite-based network 100, respectively, here by assigning codes to the up stream of data, and no code to the down stream. The radio transmission chain and the radio reception chain operate simultaneously, in cellular mode and in satellite-based mode, respectively.

The overall network therefore releases the up satellite-based pathway and establishes an up cellular pathway with the telephone 20.

While communicating, according to circumstances (alterations in the loading of the networks, change of location of the telephone 20, characteristics of the communication, etc.), the telephone 20 and the management center 205 may again negotiate the choice of networks for the up pathway and for the down pathway so as to modify, as the case may be, the network for one of the pathways or for both.

2) Outgoing Call

The case where the telephone 20 calls an information server so as to consult the latter's information will now be described by way of example.

The telephone 20 firstly searches for the most suitable networks for the up pathway and for the down pathway respectively, as a function of its location and of its requirements in respect of the specific communication which it wishes to initiate (consultation of an information server), as in the case of the incoming call. The consultation of a server by a terminal consisting for the terminal in dispatching simple requests to the server and in receiving a large stream of information from the server, the telephone 20 determines that the cellular network 200 is the most suitable for the up pathway, for cost and bit rate reasons (the satellite-based network being envisageable however) and that the down pathway absolutely must be satellite-based by reason of the data bit rate.

The telephone 20 then issues the call so as to establish the communication with the information server.

In the course of the establishing of this communication, the management center 205 searches for the most suitable networks for the up pathway and for the down pathway, as in the case of the incoming call. The management center 205 here determines that the satellite-based network 100 is the most suitable for both pathways, down and up, but that the cellular network 200 is nevertheless appropriate for both pathways, with a lower data bit rate.

The telephone 20 and the management center 205 then negotiate the choice of networks, as in the case of the incoming call. The telephone 20 ultimately chooses the satellite-based network 100 for the down pathway and the cellular network 200 for the up pathway and initiates the communication with the information server.

During the communication between the telephone 20 and the information server, the up pathway and the down pathway of the telephone 20 are respectively routed onto the cellular network 200 and onto the satellite-based network 100 by the coordination module 8. The radio transmission chain and the radio reception chain of the transmission and reception block 2 operate simultaneously, in cellular mode and in satellite-based mode respectively.

In the case where the telephone 20 were to determine that one of the pathways absolutely must be routed onto a particular network and that the loading of this network does not so permit, the telephone 20 could decide to abandon the communication.

In the description just given, the mobile telephone 20, when quiescent, is pinpointed by the two networks, satellite-based 100 and cellular 200. In a variant, the telephone 20 is pinpointed only by one of the networks, cellular 200 and satellite-based 100. Stated otherwise and according to the terminology used by the person skilled in the art, the telephone is "on-hook" to one only of the networks 200 and 100.

In the case of an incoming call, the latter is presented straightaway to the telephone 20 by the network to which it is on-hook, then, before initiating the communication, the telephone 20 and the management center 205 negotiate the choice of networks for the up pathway and for the down pathway respectively, as explained previously. As the case may be, the telephone 20 goes on-hook to the other network (to which it is not yet on-hook) and shunts one of the two pathways, up and down, or to both pathways, onto this other network.

It would also be possible to envisage the telephone 20 and the management center 205 negotiating the choice of networks during the communication already initiated.

In the case of an outgoing call, the telephone 20 issues the call via the network to which it is on-hook and then negotiates with the management center 205 the choice of networks, as explained previously. As the case may be, the telephone 20 goes on-hook to the other network and shunts one of its pathways, up and down, or both pathways, onto this other network.

Instead of being fixed, the terrestrial geographical area covered by the satellite-based network could roam around.

In the description just given, the VLR registers, the MSC centers and the traffic management system are separate, distinct entities. As a variant, it would be possible to integrate the VLR registers into the MSC centers or again to accommodate the functions of the management system in location registers and/or in MSC centers. In the latter case, the traffic management system would be distributed between these various elements.

Of course, the invention applies to any other radio communication terminal.

What is claimed is:

1. A communication process for a radio communication terminal (20) having access to a cellular communication network (200) and access to a satellite-based communication network (100), in which, in the course of one and the same communication, the terminal (20) transmits information via an up pathway and receives information via a down pathway, one of the two pathways, up and down, being cellular and the other pathway being satellite-based.

2. The process as claimed in claim 1, in which, a system (205) for managing traffic being provided so as to manage the traffic of the information through the satellite-based (100) and cellular (200) networks, the system (205) for managing traffic searches for the most suitable networks for the up pathway and for the down pathway, respectively.

3. The process as claimed in claim 2, in which the search for networks takes account of the respective locations of the terminal (20) and of its opposite party (30) and of the loading of the networks (200, 100).

4. The process as claimed in claim 1, in which the terminal (20) searches for the most suitable networks for the up pathway and for the down pathway.

5. The process as claimed in claim 4, in which the search of the terminal (20) takes account of the requirements of the terminal (20).

6. The process as claimed in claim 2, in which the system (205) for managing traffic and the terminal (20) negotiate the choice of networks for the up pathway and for the down pathway.

7. A radio communication terminal for implementing the process as claimed in claim 1, devised so as to communicate through a cellular network (200) and through a satellite-based network (100), comprising transmission means (1, 2) intended to transmit a stream of information via an up pathway and reception means (1, 2) intended to receive a stream of information via a down pathway, wherein the up pathway can be routed onto one of the two networks, satellite-based (100) and cellular (200), and the down pathway can be routed onto the other network, in the course of one and the same communication.

8. The terminal as claimed in claim 7, in which there are provided coordination means (8) devised so as to route the up pathway and the down pathway onto one of the networks and onto the other network, respectively.

9. The terminal as claimed in claim 7, in which the transmission means (1, 2) and the reception means (1, 2) are devised so as to operate simultaneously.

10. The terminal as claimed in claim 7, comprising network search means (9) devised so as to determine the most suitable networks for the up pathway and for the down pathway, respectively.

* * * * *